(12) United States Patent
Grayson

(10) Patent No.: US 12,329,080 B2
(45) Date of Patent: Jun. 17, 2025

(54) PLANT SUPPORT CLIP

(71) Applicant: CRUSHPROOF TUBING CO., McComb, OH (US)

(72) Inventor: J. Todd Grayson, McComb, OH (US)

(73) Assignee: CRUSHPROOF TUBING CO., McComb, OH (US)

( * ) Notice: Subject to any disclaimer, the term of this patent is extended or adjusted under 35 U.S.C. 154(b) by 5 days.

(21) Appl. No.: 18/392,100

(22) Filed: Dec. 21, 2023

(65) Prior Publication Data
US 2024/0206408 A1 Jun. 27, 2024

Related U.S. Application Data

(60) Provisional application No. 63/434,347, filed on Dec. 21, 2022.

(51) Int. Cl.
*A01G 9/12* (2006.01)
*F16B 2/22* (2006.01)

(52) U.S. Cl.
CPC .............. *A01G 9/128* (2013.01); *F16B 2/22* (2013.01); *A01G 9/122* (2013.01)

(58) Field of Classification Search
CPC .......... A01G 9/12; A01G 9/128; A01G 9/122; A01G 17/12; A01G 17/08; F16B 2/22; F16B 2/20; Y10T 24/344
See application file for complete search history.

(56) References Cited

U.S. PATENT DOCUMENTS

| | | | | |
|---|---|---|---|---|
| 3,494,072 A | * | 2/1970 | Olson | A01G 17/08 24/518 |
| 3,805,340 A | * | 4/1974 | Bush | A01G 17/12 24/543 |
| 4,483,098 A | * | 11/1984 | Anderson | A01G 9/128 D8/1 |
| 5,979,110 A | * | 11/1999 | Tai | A01G 9/128 24/339 |
| D418,725 S | | 1/2000 | Evans | |
| D420,554 S | | 2/2000 | Evans | |

(Continued)

FOREIGN PATENT DOCUMENTS

| | | |
|---|---|---|
| EP | 3469886 A1 | 4/2019 |
| NL | 1035644 C2 | 1/2010 |

(Continued)

*Primary Examiner* — Trinh T Nguyen
(74) *Attorney, Agent, or Firm* — Jacob M. Ward; Ward Law Office LLC

(57) ABSTRACT

A plant support device is provided which includes a first clip portion having a tab receiver and a first projecting portion. The tab receiver may include an aperture and the first projecting portion may extend outwardly from the first clip portion. The plant support device may include a second clip portion having a tab and a second projecting portion. The tab may be configured to be received by the tab receiver of the first clip portion and the second projecting portion may extend outwardly from the second clip portion. The first clip portion and the second clip portion may be configured to provide an open position and a closed position. The closed position may be defined by the tab being disposed through the tab receiver and may provide a first holding position, a second holding position, and a third holding position, to support and allow plants to grow freely.

1 Claim, 8 Drawing Sheets

(56) References Cited

U.S. PATENT DOCUMENTS

| | | | |
|---|---|---|---|
| 6,378,175 B1 | 4/2002 | Vanderpan | |
| D791,558 S * | 7/2017 | Carpio | ................................ D8/1 |
| 10,674,679 B2 * | 6/2020 | Torres Carpio | ........ A01G 17/10 |
| 11,129,340 B1 * | 9/2021 | Pena | ....................... A01G 17/10 |
| 2005/0044786 A1 * | 3/2005 | Mastronardi | .......... A01G 9/128 |
| | | | 47/43 |

FOREIGN PATENT DOCUMENTS

| | | |
|---|---|---|
| WO | 2006077269 A1 | 7/2006 |
| WO | 2014115132 A1 | 7/2014 |

* cited by examiner

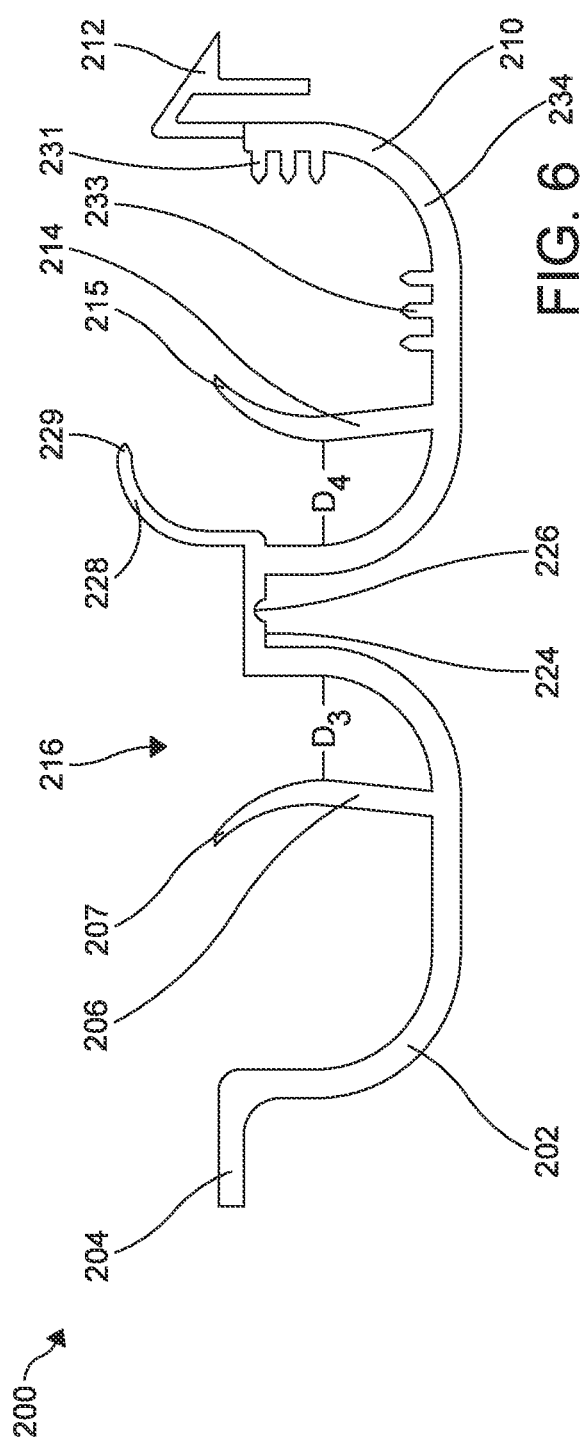
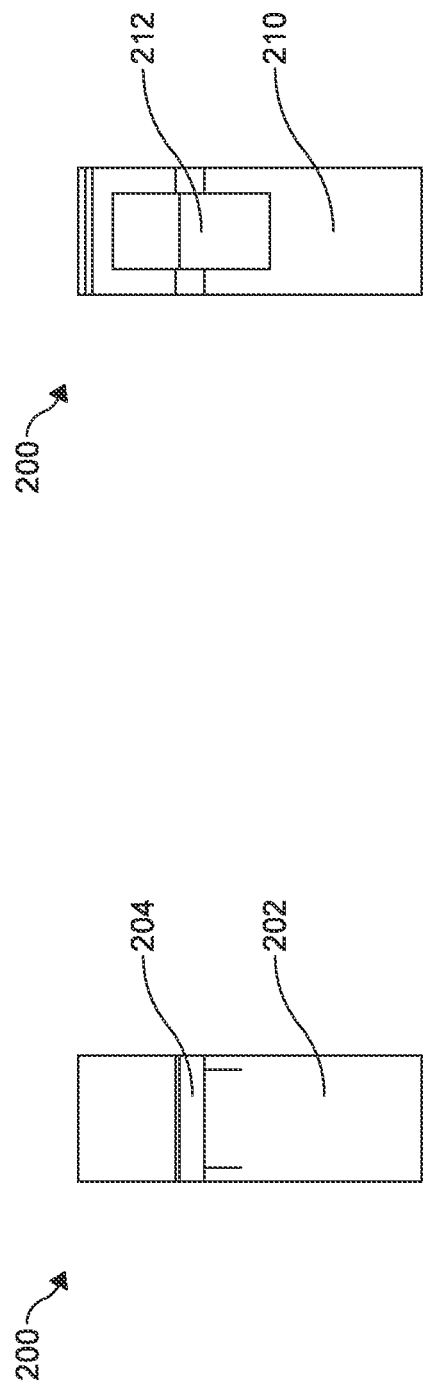

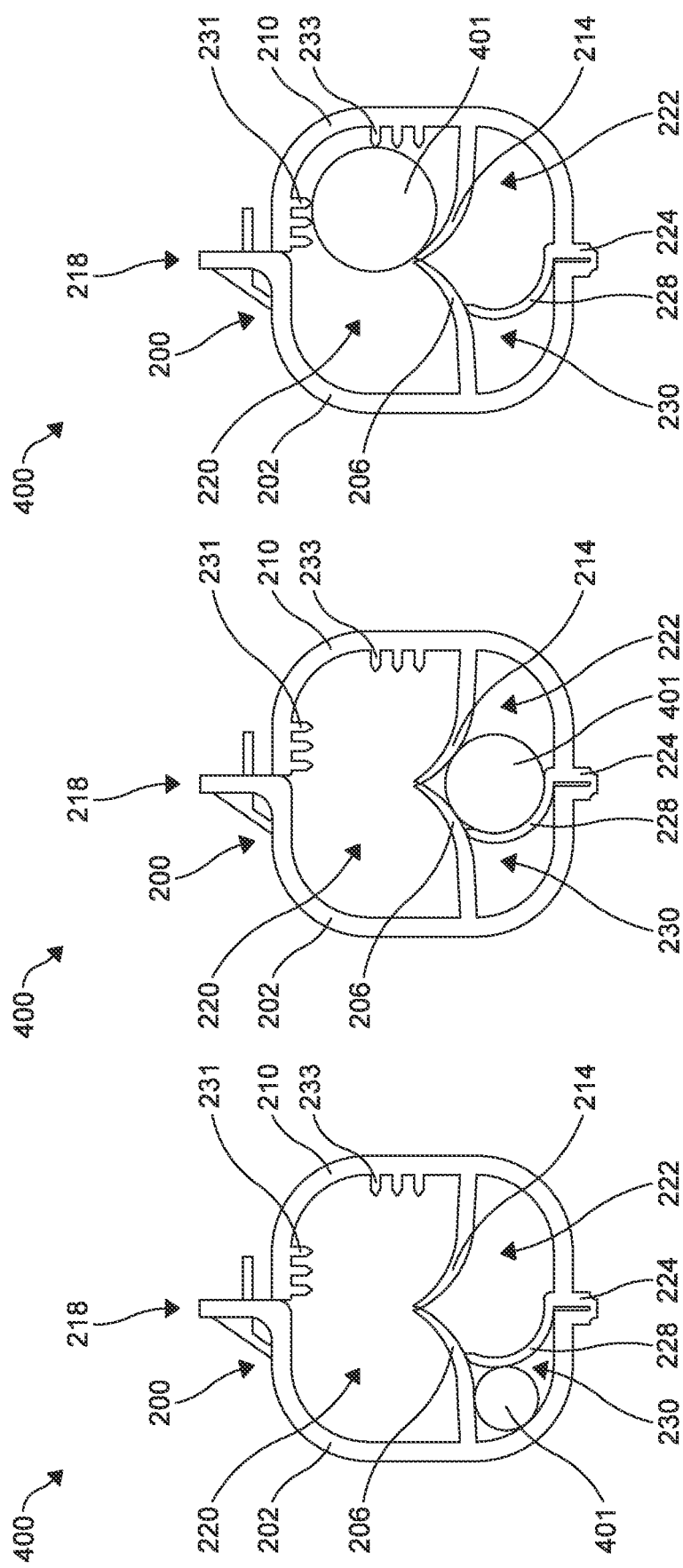

PLANT SUPPORT CLIP

CROSS-REFERENCE TO RELATED APPLICATIONS

This application claims the benefit of U.S. Provisional Application No. 63/434,347 filed on Dec. 21, 2022. The entire disclosure of the above application is incorporated herein by reference.

FIELD

The present technology relates to articles of manufacture and processes that relate to plants and supports for plants as they grow, including a plant support clip that resiliently grips a supporting structure to reinforce and protect a plant as it grows.

INTRODUCTION

This section provides background information related to the present disclosure which is not necessarily prior art.

As plants grow some may stand on their own, but others may need support to encourage healthy growth. Such plants may benefit from a supporting structure to reinforce the plant as it grows. A supporting structure may help the plant withstand the rigors of wind, rain, and weight of the plant and fruits. The supporting structure may help the plant overcome these forces and grow upward.

Such supporting structures may include stakes, ring supports, cages, trellises, and others. In many cases, the plant must be secured to the supporting structure. This may be done using twist ties, string, garden wire, zip ties, clips, and other appropriate mechanisms. It is important that the plant is sufficiently secured to the supporting structure but is still allowed sufficient room to grow.

Staking a plant has many advantages. For example, a stake may use less space than cages, ring supports, and trellises. A stake is easy to install and keeps the plant off the ground for cleaner fruit and less rotting. Additionally, staking makes it easy to see the plant and the fruit and/or vegetable of the plant for easier harvesting. However, if the plant is improperly secured or too tightly secured to the stake, the plant may be broken or damaged, thus hindering the growth and quality of the plant.

Accordingly, there is a need for a device that may resiliently grip a supporting structure such as a stake to reinforce a plant as it grows without damaging the plant.

SUMMARY

In concordance with the instant disclosure, a device that may resiliently grip a supporting structure such as a stake to reinforce a plant as it grows without damaging the plant, has surprisingly been discovered.

The present technology includes articles of manufacture, systems, and methods that relate to a plant support device.

In a first embodiment, a plant support device is provided. The plant support device may include a first clip portion having a tab receiver and a first projecting portion. The tab receiver may include an aperture and the first projecting portion may extend outwardly from the first clip portion. The plant support device may include a second clip portion having a tab and a second projecting portion. The tab may be configured to be received by the tab receiver of the first clip portion and the second projecting portion may extend outwardly from the second clip portion. The first clip portion and the second clip portion may be configured to provide an open position and a closed position. The closed position may allow a plant stem or stake to be supported by the plant support device. The first projecting portion may be configured to provide a first holding position and the second projecting portion may be configured to provide a second holding position when the first clip portion and the second clip portion may be in the closed position. The plant support device may include a hinge separating the first clip portion and the second clip portion. The hinge may be configured to enable the open position and the closed position. Each of the first projecting portion and the second projecting portion may be disposed adjacent the hinge at an equal distance.

In a second embodiment, a plant support device is also provided. The plant support device may include a first projecting portion that extends outwardly from the first clip portion towards the tab receiver. The first projecting portion may include a first tip pointed or angled towards the tab receiver. In this embodiment, the second projecting portion may extend outwardly from the second clip portion towards the tab. The second projecting portion may include a second tip pointed or angled towards the tab. The second clip portion also may include a third projecting portion extending outwardly from the second clip portion towards the tab. The third projecting portion may include a third tip pointed or angled towards the tab. The third projecting portion may be configured to provide a third holding position when the first clip portion and the second clip portion may be in the closed position. Further, the second clip portion includes a plurality of ridges configured to grip the plant stem for extra support. The plurality of ridges may include a first set of ridges spaced from a second set of ridges by a curved portion of the second clip portion. The interior surface of the first clip portion may be substantially smooth while the curved portion may my substantially uninterrupted.

In a further embodiment, a method of using a plant support device is provided. The method may include the steps of providing a plant support device as described. The method may also include a step of clipping the plant support device to a stem of a plant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a top plan view of the plant support device shown in FIG. 4;

FIG. 7 is a left-side elevational view of the plant support device shown in FIG. 4;

FIG. 8 is a right-side elevational view of the plant support device shown in FIG. 4;

FIG. 13 is a top plan view of the plant support device shown in FIG. 4, with the plant supported in the third holding position;

FIG. 14 is a top plan view of the plant support device shown in FIG. 4, with the plant supported in the second holding position;

FIG. 15 is a top plan view of the plant support device shown in FIG. 4, with the plant supported in the first holding position.

DETAILED DESCRIPTION

Figure 1:
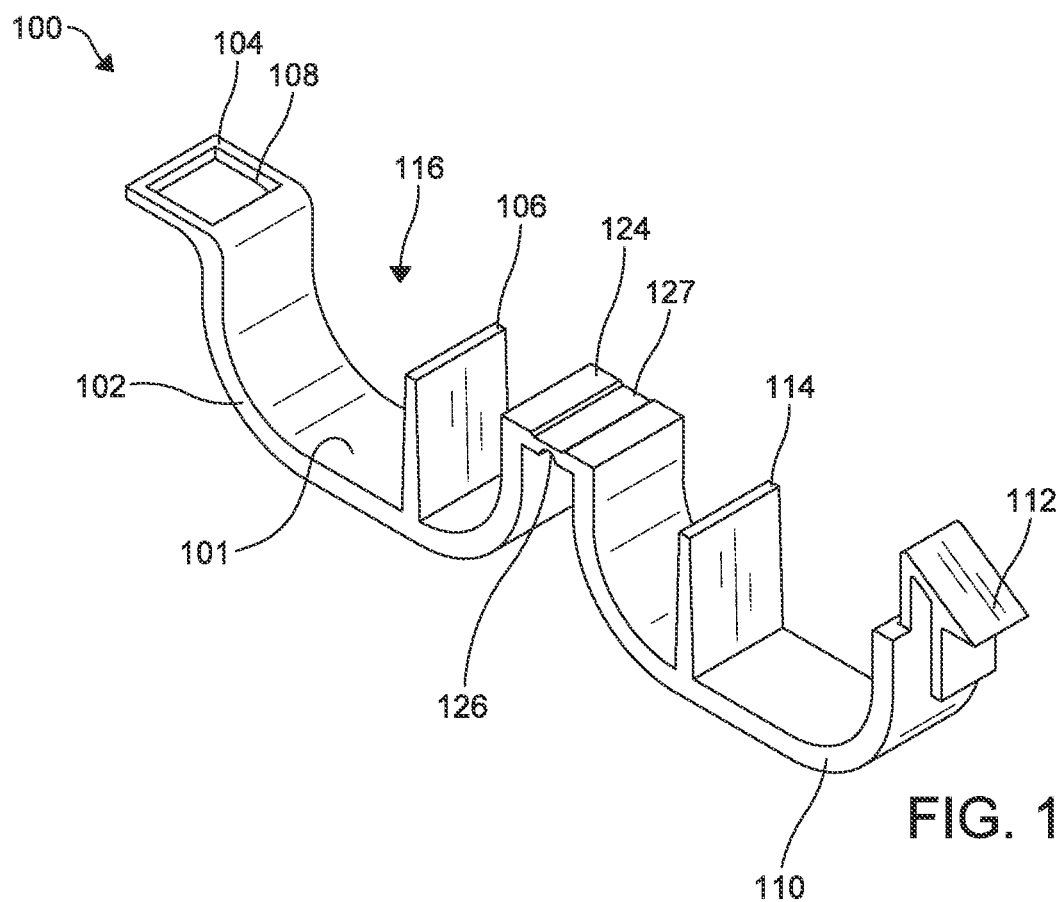
FIG. 1 is a top perspective view of a first embodiment of the plant support device.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components, or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
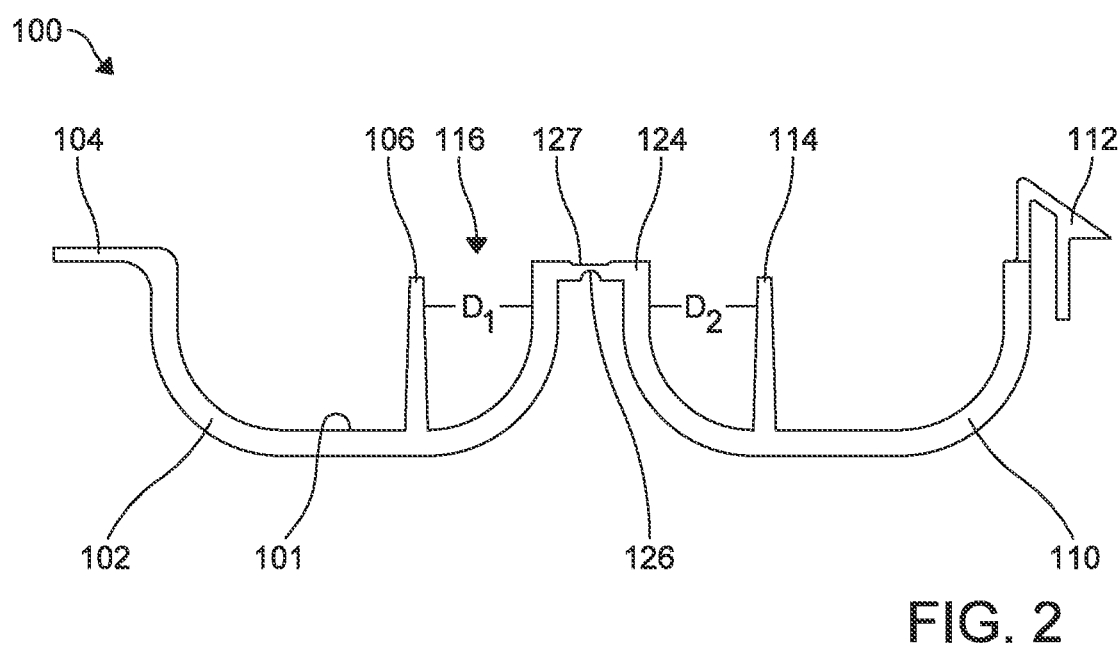
FIG. 2 is a top plan view of the plant support device shown in FIG. 1.
Figure 3:
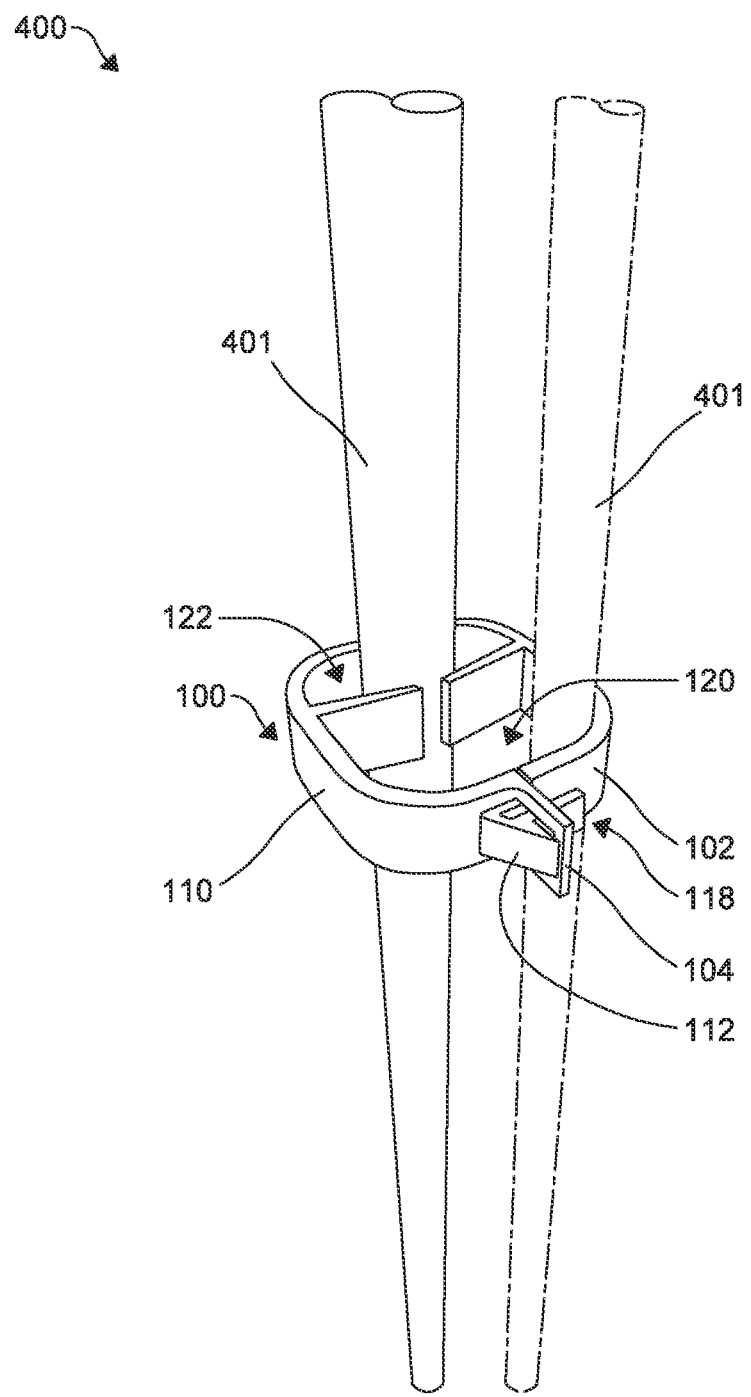
FIG. 3 is an environmental view of the plant support device shown in FIG. 1.
Figure 4:
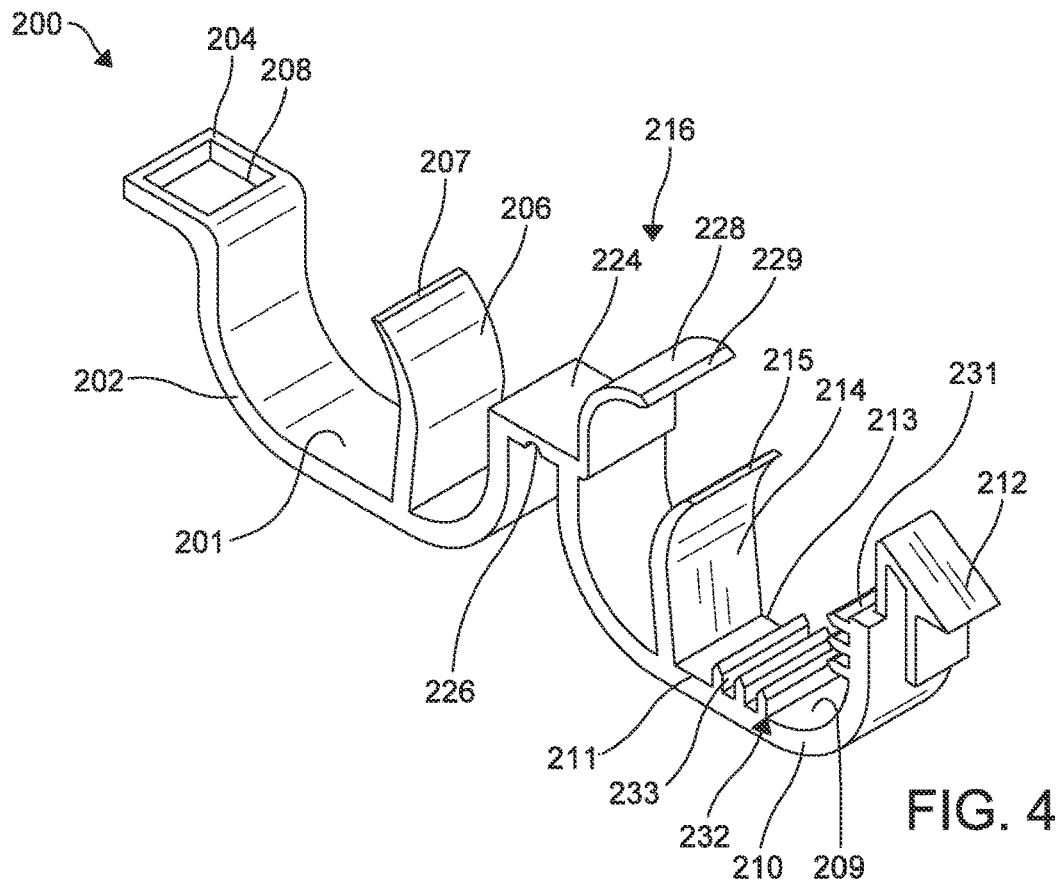
FIG. 4 is a top perspective view of a second embodiment of the plant support device in the open position.
Figure 5:
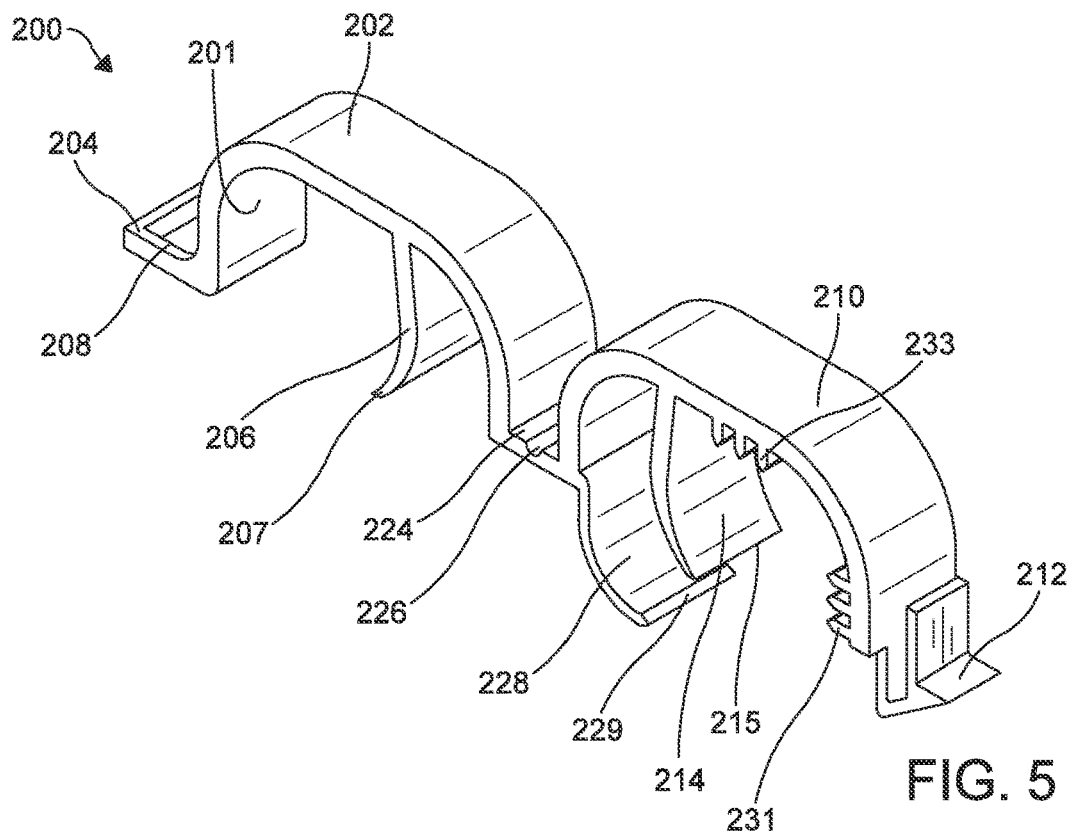
FIG. 5 is a bottom perspective view of the plant support device shown in FIG. 4.
Figure 9:
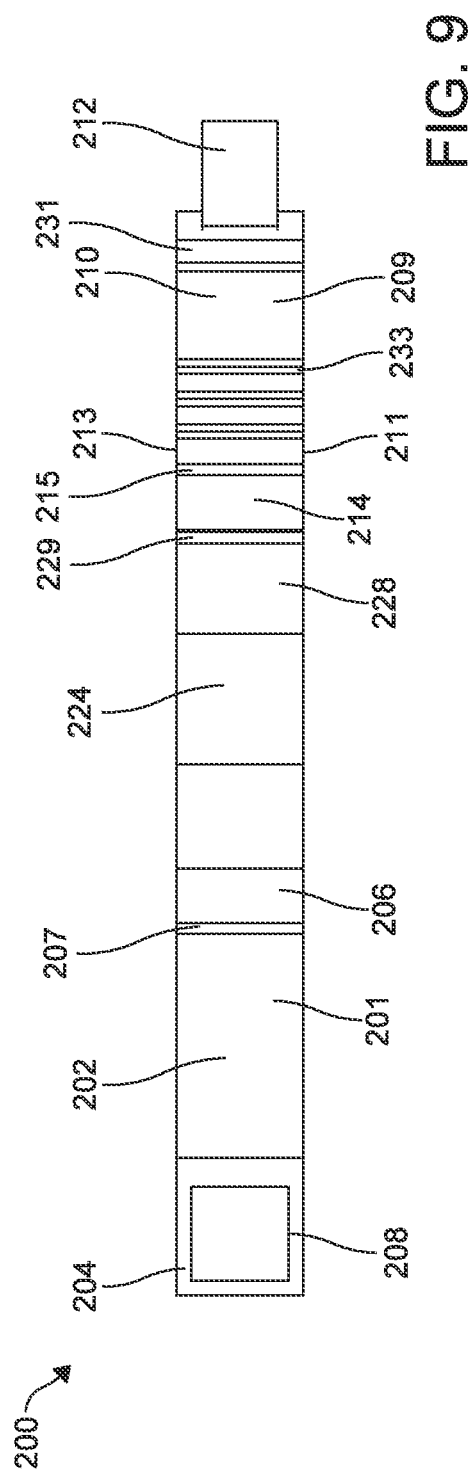
FIG. 9 is a front elevational view of the plant support device shown in FIG. 4.
Figure 10:
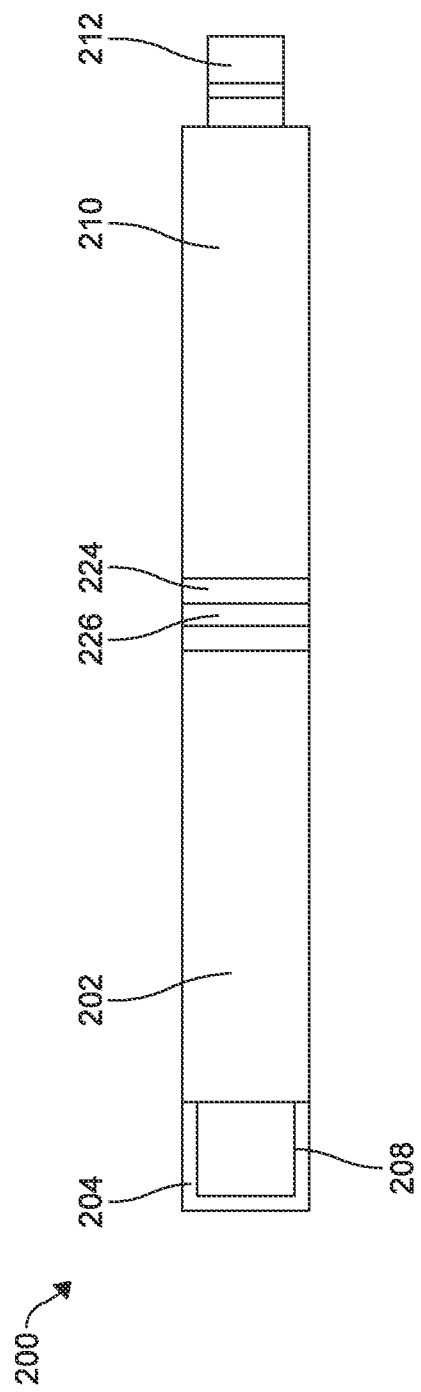
FIG. 10 is a rear elevational view of the plant support device shown in FIG. 4.

The present technology relates to a plant support device 100, shown generally in the accompanying FIGS. 1-3. Another embodiment of a plant support device 200 is also provided and shown generally in the accompanying FIGS. 4-15. Advantageously, the plant support device 100 and plant support device 200 may resiliently hold a plant and allow the plant to grow freely without damaging the plant. Ways of using the plant support device 100 and plant support device 200 are also provided, as shown generally in the accompanying FIG. 16.

Generally, the plant support device 100 may include a first clip portion 102 and a second clip portion 110, as shown in a first embodiment in FIGS. 1-3. The first clip portion 102 may include a tab receiver 104 and a first projecting portion 106. The tab receiver 104 may also include an aperture 108 therethrough. The first projecting portion 106 may extend outwardly from the first clip portion 102. In a certain embodiment, the first projecting portion 106 may be disposed perpendicular to the first clip portion 102. Additionally, the second clip portion 110 may include a tab 112 and a second projecting portion 114. The tab 112 may be configured to be received by the tab receiver 104 of the first clip portion 102. The second projecting portion 114 may also extend outwardly from the second clip portion 110. The second projecting portion 114 may be disposed perpendicular to the second clip portion 110.

More specifically, the first clip portion 102 and the second clip portion 110 may be configured to provide an open position 116 and a closed position 118. The closed position 118 may be defined by the tab 112 being disposed through the tab receiver 104, as shown in FIG. 3. The first projecting portion 106 may be disposed directly opposite the second projecting portion 114 when the plant support device 100 is in the closed position 118 and may define holding positions to allow a plant stem to fit through. The first projecting portion 106 and the second projecting portion 114 may pinch varying sizes of plant stems and garden stakes or other objects to allow the plant to grow freely through the plant support device 100. The first projecting portion 106 may be configured to provide a first holding position 120 when the first clip portion 102 and the second clip portion 110 may be in the closed position 118 and the second projecting portion 114 may be configured to provide a second holding position 122 when the first clip portion 102 and the second clip portion 110 may be in the closed position 118.

The plant support device 100 may further include a hinge 124 separating the first clip portion 102 and the second clip portion 110. The hinge 124 may include a divot 126 centrally disposed on the hinge 124. In another embodiment, the plant support device 100 may include another divot 127, as shown in FIGS. 1 and 2. One of ordinary skill in the art may select a suitable number of divots 126 within the scope of the present disclosure. The hinge 124 may be configured to enable the open position 116 and the closed position 118 of the first clip portion 102 and the second clip portion 110. The divot 126 may facilitate the bendable capability of the hinge 124 as well. The first projecting portion 106 may be disposed adjacent the hinge 124 at a first distance (D1) and the second projecting portion 114 may be disposed adjacent the hinge 124 at a second distance (D2). In some embodiments, the first distance (D1) may be equal to the second distance (D2).

The first projecting portion 106 may also be tapered and the second projecting portion 114 may be tapered. The first clip portion 102 may include an interior surface 101 that may be substantially uninterrupted.

A plant support device 200 may also be provided, in another embodiment, with reference to FIGS. 4-15. The plant support device 200 may include a first clip portion 202 and a second clip portion 210, as described herein. The first clip portion 102 and the second clip portion 110 may be configured to provide an open position 216 and a closed position 218.

The first clip portion 202 may include a tab receiver 204 and a first projecting portion 206. The first clip portion 202 may include an interior surface 201 that may be substantially uninterrupted. The tab receiver 204 may also include an aperture 208 therethrough. The first projecting portion 206 may extend outwardly from the first clip portion 202 and may further extend towards the tab receiver 204. The first projecting portion 206 may include a first tip 207 pointed or angled towards the tab receiver 204. The first projecting portion 206 may also be tapered, which may further define the first tip 207.

The second clip portion 210 may include a tab 212, a second projecting portion 214, and a third projecting portion 228. The tab 212 may be configured to be received by the tab receiver 204 of the first clip portion 202. The second projecting portion 214 may also extend outwardly from the second clip portion 210 and may further extend towards the tab 212. The third projecting portion 228 may extend outwardly from the second clip portion 210 and may also extend towards the tab 212. The second projecting portion 214 may include a second tip 215 pointed or angled towards the tab 212. Further, the third projecting portion 228 may include a third tip 229 pointed or angled towards the tab 212. The second projecting portion 214 and the third projecting portion 228 may be tapered, which may further define the second tip 215 and the third tip 229, respectively. The third projecting portion 228 may also be spaced apart from the second projecting portion 214.

The open position 216 may be defined by the de-coupling of the tab 212 and the tab receiver 204, as specifically shown in FIGS. 4-11. The closed position 218 may be defined by the coupling of the tab 212 and the tab receiver 204, as shown in FIGS. 12-15. Specifically, the closed position 218 may be defined by the tab 212 being disposed through the tab receiver 204. Further, the closed position 218 may define a first holding position 220, a second holding position 222, and a third holding position 230. The first projecting portion 206 may be configured to provide the first holding position 220 when the first clip portion 202 and the second clip portion 210 may be in the closed position 218. The second projecting portion 214 may be configured to provide the second holding position 222 when the first clip portion 202 and the second clip portion 210 may be in the closed position 218. The third projecting portion 228 may be configured to provide the third holding position 230 when the first clip portion 202 and the second clip portion 210 may be in the closed position 218.

Generally, the first projecting portion 206 may be disposed directly opposite the second projecting portion 214 when the plant support device 200 is in the closed position 218 and may define one holding position to allow a plant stem or stake to fit through, as further described herein. The third projecting portion 228 may be disposed substantially between the first projecting portion 206 and the second projecting portion 214 when the plant support device 200 is in the closed position 218 and may define two holding positions to allow a plant stem or stake to fit through, as further described herein. The first projecting portion 206, the second projecting portion 214, and the third projecting portion 228 may pinch varying sizes of plant stems and garden stakes or other objects to allow the plant to grow freely through the plant support device 200. Advantageously, the first projecting portion 206, the second projecting portion 214, and the third projecting portion 228 may bendably hold different sized stakes or plant stems enough so that the plant is not chafed or damaged as it grows. Further, the plant support device 200 may remain in a fixed position on the support feature. The first projecting portion 206, the second projecting portion 214, and the third projecting portion 228 may bend a predetermined distance as determined by a size of the support feature and a resiliency of the tab to hold the support feature. As would be apparent to someone of ordinary skill in the art, the plant support clip may be configured to hold any appropriately desired size and configuration of support feature. Further, one of ordinary skill in the art may select a suitable configuration with multiple different holding positions to hold any appropriately desired sized plants or stakes.

The first holding position 220 may be defined as the area between the first projecting portion 206 and the second projecting portion 214, opposite the second holding position 222 and the third holding position 230, as shown in FIG. 15. Particularly, this includes the inside area near the tab 212 and the tab receiver 204. The first tip 207 of the first projecting portion 206 may touch the second tip 215 of the second projecting portion 214. A plant 401 or stake may be supported in the first holding position 220. Alternatively, two plants 401 or stakes may be supported in the first holding position 220. Advantageously, the first holding position 220 may be configured to support plants with larger stems or multiple plants because of the relatively larger holding area compared to the second holding position 222 and the third holding position 230.

The second holding position 222 may be defined as the area between the second projecting portion 214 and the third projecting portion 228. More specifically, the second tip 215 of the second projecting portion 214 may touch the third tip 229 of the third projecting portion 228, which may further define the second holding position 222. The plant 401 may also be supported in the second holding position 222, as shown in FIG. 14. In another embodiment, multiple plants 401 or a combination of a plant 401 and a stake may be held in the second holding position 222. Advantageously, the second projecting portion 214 and the third projecting portion 228 may bendably hold the plant 401 or stake to allow the plant 401 to grow freely.

The third holding position 230 may be defined as the area between the first projecting portion 206 and the third projecting portion 228. More specifically, the third tip 229 of the third projecting portion 228 may touch a portion of the first projecting portion 206, which may further define the third holding position 230. A plant 401 may be supported in the third holding position 230 or a stake may be supported in the third holding position 230. Advantageously, the third holding position 230 may support plant stems or stakes that are substantially smaller and may require more support.

The plant support device 200 may further include a hinge 224 separating the first clip portion 202 and the second clip portion 210. The hinge 224 may include a divot 226 centrally disposed on the hinge 224. The hinge 224 may be configured to enable the open position 216 and the closed position 218 of the first clip portion 202 and the second clip portion 210. The first projecting portion 206 may be disposed adjacent the hinge 224 at a first distance (D3) and the second projecting portion 214 may be disposed adjacent the hinge 224 at a second distance (D4). In some embodiments, the first distance (D3) may be equal to the second distance (D4). The third projecting portion 228 may be disposed adjacent the hinge 224. In another embodiment, the third projecting portion 228 may be disposed on the hinge 224. One of ordinary skill in the art may select a suitable location for the third projecting portion 228 within the scope of the present disclosure.

Figure 12:
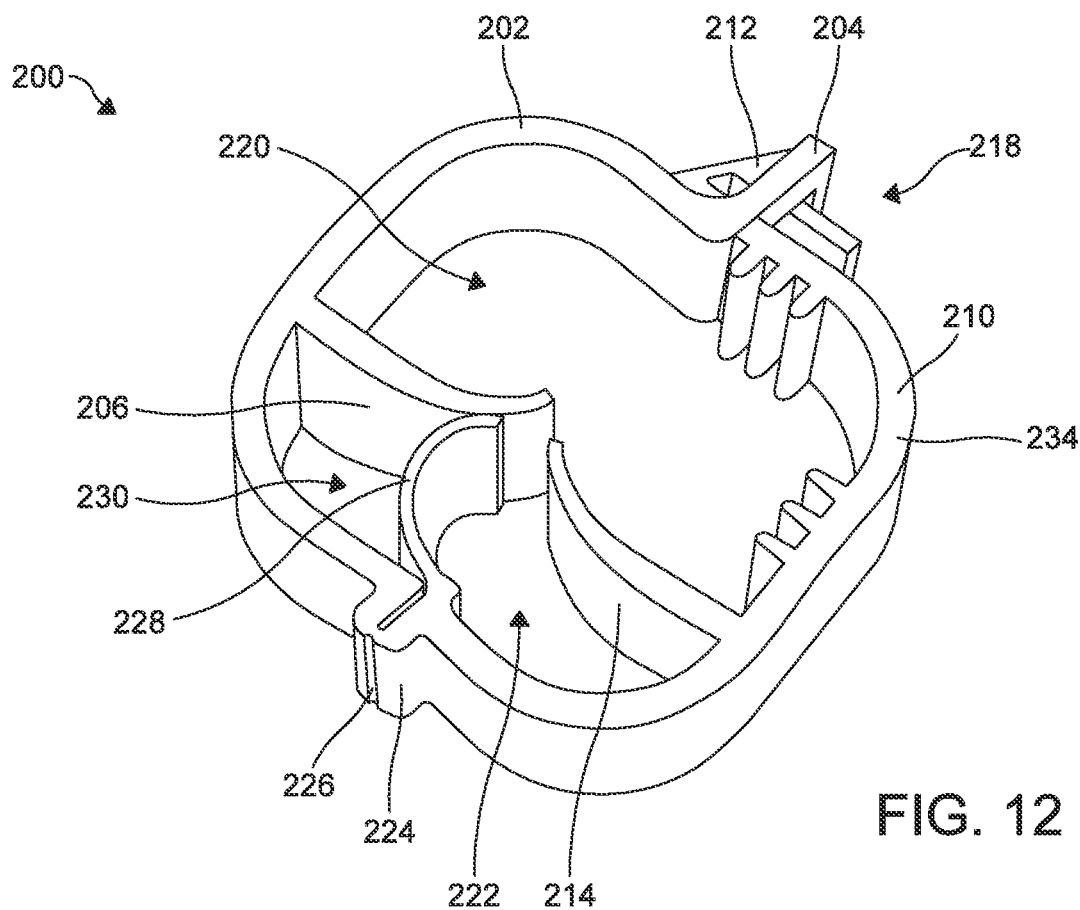
FIG. 12 is a top perspective view of the plant support device shown in FIG. 4 in the closed position.

The second clip portion 210 may also include a plurality of ridges 232. The plurality of ridges 232 may include a first set of ridges 231 spaced from a second set of ridges 233 by a curved portion 234 of the second clip portion 210. In a certain embodiment, the curved portion 234, as shown in FIG. 6 and FIG. 12, may result in the first set of ridges 231 being orthogonal to the second set of ridges 233. Further, the curved portion 234 may space the first set of ridges 231 from the second set of ridges 233 such that the surface may be uninterrupted and smooth. More specifically, an interior 209 may be smooth and uninterrupted, further defining the curved portion 234. The first set of ridges 231 and the second set of ridges 233 may be disposed on the interior 209 of the second clip portion 210. Each of the ridges of the first set of ridges 231 may extend along an entirety of the interior 209 of the second clip portion 210 from a first edge 211 to a second edge 213. Each of the ridges of the second set of ridges 233 may extend along an entirety of the interior 209 of the second clip portion 210 from the first edge 211 to the second edge 213. Advantageously, the first set of ridges 231 and the second set of ridges 233 are configured to grip the stem of the plant and further militating against movement of the stem of the plant. As a non-limiting example, the first set of ridges 231 may include three ridges and the second set of ridges 233 may include three ridges. One of ordinary skill in the art may select suitable ridges within the scope of the present disclosure.

Figure 11:
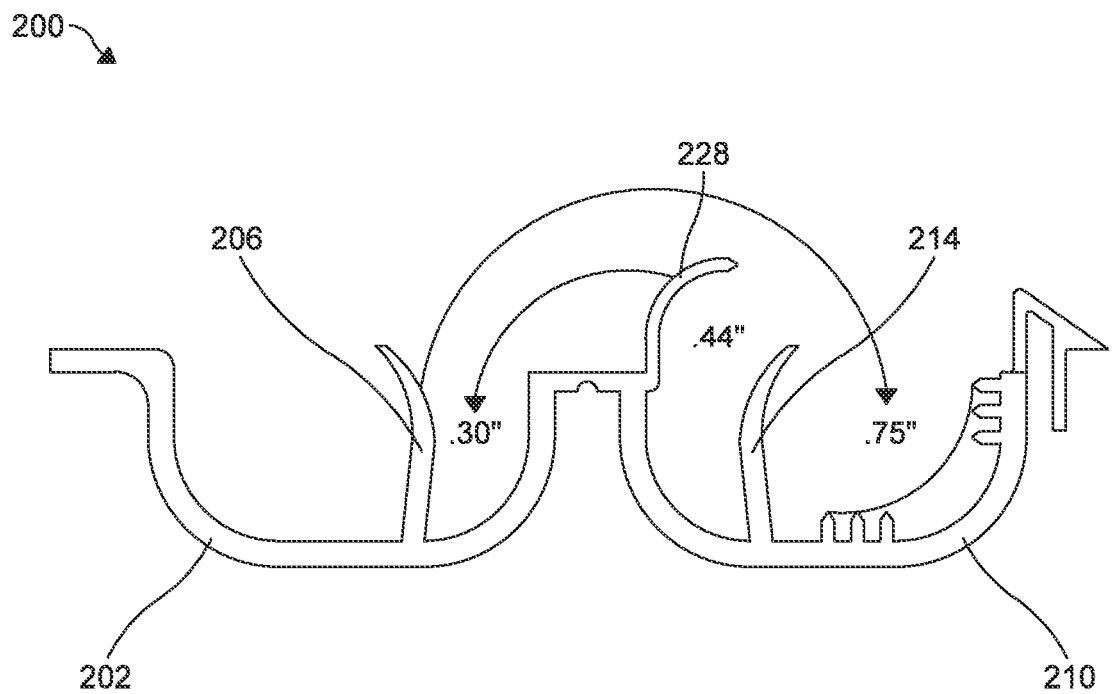
FIG. 11 is a front elevational view of a particular embodiment of the plant support device shown in FIG. 4, illustrating the dimensions.

With reference to FIG. 11, a particular embodiment of the plant support device 200 is shown. The plant support device 200 may be sized according to the dimensions shown in FIG. 11. As a non-limiting example, the plant support device 200 may be sized according to dimensions of 0.30 inches, 0.44 inches, and 0.75 inches, as shown in FIG. 11. One of ordinary skill in the art may select a suitable configuration and dimensions for the plant support device 200 within the scope of the present disclosure.

The plant support device 200 (and the plant support device 100, as described herein) may fit standard manufactured support features, such as a pole, but also bamboo stakes and other support features as appropriately desired. In particular, the plant support device 200 (and the plant support device 100, as described herein) may provide a resilient grip on smooth and rough surfaces to secure the plant. In certain embodiments, the plant support clip may be manufactured from a rigid plastic. For example, the plant support clip may be manufactured using a polypropylene (PP) thermoplastic material, a polyvinyl chloride (PVC) thermoplastic material, a polyethylene (PE) plastic material, an acrylonitrile butadiene styrene (ABS) plastic material, and combinations thereof. However, as would be apparent to someone of ordinary skill in the art, the plant support clip may be manufactured from any appropriately desired plastic or other material. In certain embodiments, the plant support clip may be configured for supporting a tomato plant.

A plant support system 400 and 400' is also provided. The plant support system 400 may include a plant support device 100 as described herein and shown in FIG. 3. The plant support system 400' May include a plant support device 200 as described herein and as shown in FIGS. 13-15. The plant support system 400 and 400' May also include a plant 401 or a stake. As specifically shown in FIG. 3, the plant support device 100 may support the plant 401 in the second holding position 122, and may further support another plant 401 (shown in phantom in FIG. 3) in the first holding position 120. As specifically shown in FIG. 13, the plant support device 200 may support the plant 401 in the third holding position 230. As shown in FIG. 14, the plant support device 200 may support the plant 401 in the second holding position 222. Additionally, with reference to FIG. 15, the plant support device 200 may support the plant 401 in the first holding position 220. In another embodiment, the plant support device 200 may support the plant 401 in each of the first holding position 220, second holding position 222, and the third holding position 230. The plant support device 200 may support plants 401 or stakes in different combinations. Advantageously, the plant 401 or stake may be supported in any holding position or combination thereof using the plant support device 100 or plant support device 200, as shown in FIGS. 3 and 13-15, to allow the plant to grow freely.

Figure 16:
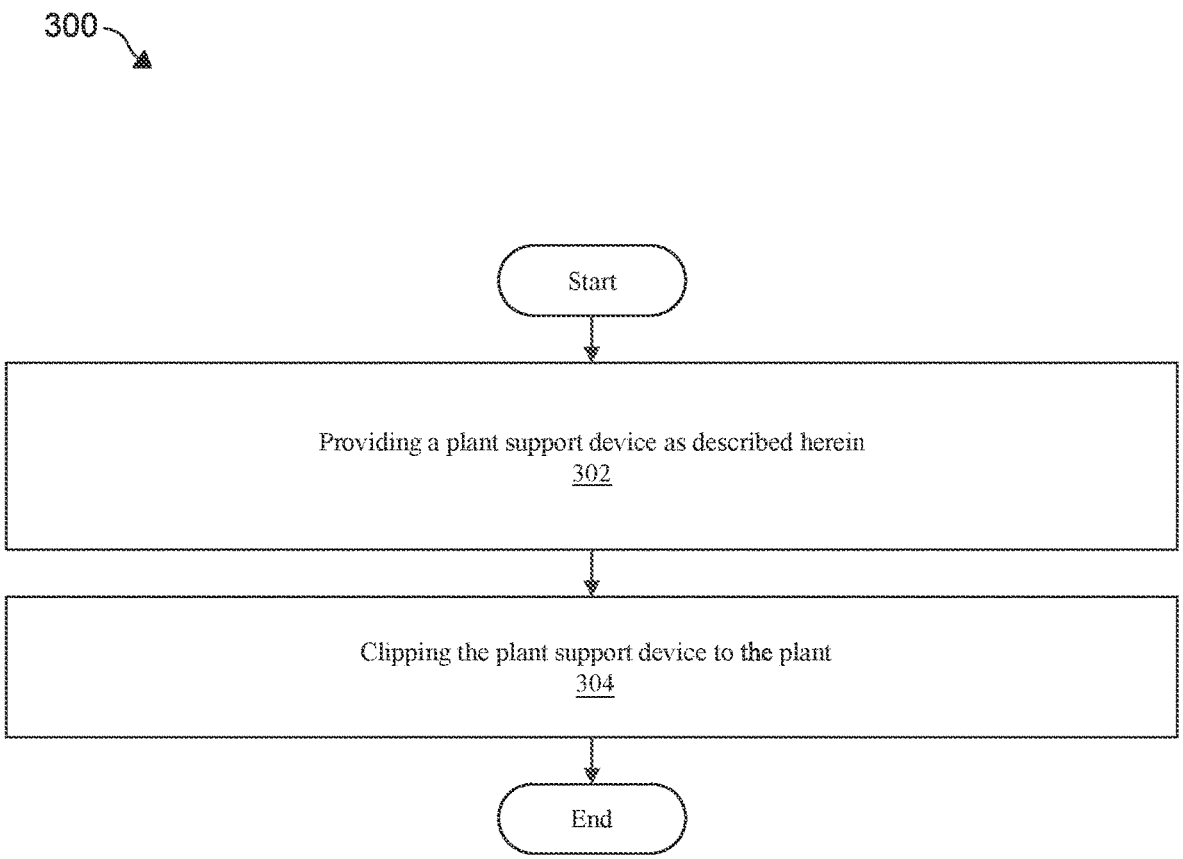
FIG. 16 is a flowchart illustrating a method of using a plant support device, according to an embodiment of the present disclosure.

FIG. 16 is a flowchart that describes a method 300 of using a plant support device 100 or plant support device 200 to support a plant 401, according to another embodiment of the present disclosure. At step 302, the method 300 may include providing plant support device 100 or plant support device 200 as described herein. At step 304, the method 300 may include clipping the plant support device 100 or plant support device 200 to the plant 401. In another embodiment, the plant support device 100 or plant support device 200 may be clipped to a stake or a combination of a stake or plant 401.

Advantageously, the plant support device 100 and plant support device 200 may support multiple plant stems and a plant 401 may be held in any holding position of the plant support device 100 or plant support device 200. Desirably, each of the first projecting portion 106, 206, the second projecting portion 114, 214, and the third projecting portion 228 may bendably hold the stem of the plant or a stake without damaging the plant. Advantageously, the first set of ridges 231 and the second set of ridges 233 of the plant support device 200 are configured to grip the stem of the plant and further militating against movement of the stem of the plant. Additionally, the closed position 118, 218 may define several different holding positions, namely, the first holding position 120, 220, the second holding position 122, 222, and may even provide the third holding position 230, each capable of holding different plant stems or stakes, or combinations thereof.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A plant support device, comprising:
a first clip portion having a tab receiver and a first projecting portion, the tab receiver including an aperture therethrough, the first projecting portion extending outwardly from the first clip portion; and
a second clip portion having a tab and a second projecting portion, the tab configured to be received by the tab receiver of the first clip portion, the second projecting portion extending outwardly from the second clip portion,
wherein:
the first clip portion and the second clip portion are configured to provide an open position and a closed position, the closed position defined by the tab being disposed through the tab receiver,
the first projecting portion is configured to provide a first holding position when the first clip portion and the second clip portion is in the closed position and the second projecting portion is configured to provide a second holding position when the first clip portion and the second clip portion is in the closed position,
the first projecting portion extends outwardly from the first clip portion towards the tab receiver,
the first projecting portion includes a first tip pointed towards the tab receiver,
the second projecting portion extends outwardly from the second clip portion towards the tab,
the second projecting portion includes a second tip pointed towards the tab,
the second clip portion includes a third projecting portion extending outwardly from the second clip portion towards the tab,
the third projecting portion includes a third tip pointed towards the tab,
the third projecting portion is configured to provide a third holding position when the first clip portion and the second clip portion is in the closed position,
the second clip portion includes a plurality of ridges,
the plurality of ridges includes a first set of ridges spaced from a second set of ridges by a curved portion of the second clip portion,
each of the ridges of the first set of ridges extend along an entirety of an interior of the second clip portion from a first edge to a second edge,
each of the ridges of the second set of ridges extend along an entirety of an interior of the second clip portion from a first edge to a second edge.

* * * * *